United States Patent [19]

Inoue et al.

[11] Patent Number: 4,705,381

[45] Date of Patent: Nov. 10, 1987

[54] PHOTOGRAPHING APPARATUS FOR MICROSCOPE

[75] Inventors: Yasuo Inoue, Hachiouji; Daizo Shinohara, Fuchu, both of Japan

[73] Assignee: Olympus Optical Co., Ltd., Tokyo, Japan

[21] Appl. No.: 924,036

[22] Filed: Oct. 28, 1986

[30] Foreign Application Priority Data

Oct. 30, 1985 [JP] Japan .................................. 60-241338

[51] Int. Cl.$^4$ .......................... G03B 7/00; G03B 13/02; G03B 17/48

[52] U.S. Cl. .................................... 354/411; 354/471; 354/480; 354/79; 354/466; 354/289.1; 354/456

[58] Field of Search ............... 354/410, 411, 465, 471, 354/62, 79, 456, 155, 219, 224, 225, 289.1, 476, 289.12, 479, 480; 350/502; 356/229-231

[56] References Cited

U.S. PATENT DOCUMENTS 4,643,550 2/1987 Kitagawa et al. ..................... 354/79

FOREIGN PATENT DOCUMENTS 61-43716 3/1986 Japan .

Primary Examiner—W. B. Perkey
Attorney, Agent, or Firm—Cushman, Darby & Cushman

[57] ABSTRACT

A photographing apparatus for microscopes, in order to make it possible to obtain a photograph of a proper exposure always irrespective of the size of a sample image, comprising an indicator arranged in a position substantially conjugate with an image surface of the photographing apparatus, a first light source for illuminating the indicator, an output generating means for determining an exposure time in photographing of a sample image and an adjusting means capable of proportionally adjusting the brightness of the first light source and an output to be issued from the output generating means, an output to be issued from the output generating means being determined so as to make it possible to photograph the sample image with a proper exposure by operating the first adjusting means to make the brightness of the indicator coincide with the brightness of the sample image formed on the indicator. This apparatus can be detachably mounted on the body of a conventional automatic exposure photographing apparatus for microscopes, is simple in the structure and can be manufactured at a low cost.

16 Claims, 10 Drawing Figures

PHOTOGRAPHING APPARATUS FOR MICROSCOPE

BACKGROUND OF THE INVENTION (a) Field of the Invention:

This invention relates to a microscopic photographing apparatus wherein a proper exposure can be obtained for a minute sample image in photographing in a dark field or photographing an image obtained by a fluorescent microscope.

(b) Description of the Prior Art:

An average-spot light measurement switching system whereby the light of the part of 30% of the area of the picture frame (24×36 mm) of a 35 mm film or 1% of the center part of the picture frame is measured is adopted in most of photographing apparatus adapted for a dark field in which the background is dark or a fluorescent microscope among photographing apparatus for microscopes. In such apparatus, a mark showing a 1% light measuring area of a light receiving element is indicated within a viewer so that, by the user, an image may be superposed on the area and, in case the image occupies an area more than 1%, the image will be photographed without correcting the exposure but, when the sample image is less than 1%, the ratio of the area of the image to the area of the 1% area will be determined by sight and the exposure will be corrected. In some case, the light measuring area is made smaller to be a 0.25% light measuring area than the 1% light measuring area.

An example of this kind of conventional microscopic photographing apparatus is shown in FIG. 1.

That is to say, in FIG. 1, the reference numeral 1 represents an automatic exposure photographing apparatus body. A primary image $A_1$ projected by an objective lens not illustrated is magnified by a photographing lens 2 and enters a prism 3. Here, by a first beam splitter 3a, a part of the light is transmitted to a light measuring optical system, passes through an image forming lens 4 and an average-spot switching slider 5 and forms an image on a light receiving element 6a connected to a photographing exposure time controlling circuit 6. By a second beam splitter 3b, another part of the light is transmitted to an observing optical system and forms a secondary image $A_2$ through an image forming lens 8 of a viewer 7. The secondary image $A_2$ is magnified by an eyepiece 10 and is observed or focused. The light havng passed through the prism 3 passes through a shutter 11 and forms a secondary image $A_3$ on a film surface 13 of a film cassette 12.

The pinholes 5a and 5b of the slider 5 are of hole diameters corresponding respectively to the respective areas of the average and spot light measurements of the photographed picture frame. The positions of these pinholes 5a and 5b must be in the positions conjugate with the areas of the average and spot light measurements.

However, the above-mentioned conventional apparatus has such problems as are mentioned below.

FIG. 2 is an elevation of a focus plate 9. The secondary image 14a is an image larger than the spot light measuring area 15. In such case, the image is focused with double cross lines 16 and then can be photographed without correcting the exposure. However, in case the secondary image is smaller than the spot light measuring area 15, when the back is dark but the sample is bright, the exposure must be corrected carefully. That is to say, if the sizes of the secondary images 14b, 14c and 14d are respectively ½, 1/10 and 1/20 the spot light measuring area and the brightness is the same as of the secondary image 14a, first of all, the measured light amount will reduce and therefore will exceed the limit of the light measuring capacity of the light receiving element 6a, a warning will be issued and the automatic exposure will be impossible. Second, even if it is within the light measuring capacity, the user will determine the area ratio by sight and will correct the exposure. However, in the case of the secondary images 14c and 14d, it will be difficult to prevent the exposure from being wrong.

| Sample image | 14a | 14b | 14c | 14d |
| --- | --- | --- | --- | --- |
| Rate of the area of the sample image to the spot area | 100% | 50% | 10% | 5% |
| Exposure indicating time | 10 seconds | 20 seconds | 100 seconds | 200 seconds |
| Necessary exposure correction | unnecessary | ½ | 1/10 | 1/20 |
| Final exposure time | | 10 seconds | | |

Thus, in the prior art, there is a problem that, even with an automatic exposure photographing device, the exposure must be corrected more complicatedly than in the manual exposure operation.

If the light measuring area is made smaller, in order to keep the light measuring ability in response to it, the light measuring device must be made high in the performance. However, the performance is limited and 1% light measurement has been general. If the light measurement of the area less than 1% is made so as to be possible, it will be difficult to maintain the light measuring area indication and the optical axial precision of the light measuring optical system. This has been also one of the reasons for making the 1% light measurement a limit. As one of the solutions of this difficulty, there is taken a system wherein the optical axes between the viewer for confirming the light measuring area and the box containing the light receiving element are adjusted with each other and are then fixed to eliminate the interchangeability.

SUMMARY OF THE INVENTION

A primary object of the present invention is to provide a microscopic photographing apparatus wherein a proper exposure can be always obtained irrespective of the size of the sample image including a sample image far smaller than the light measuring spot.

Another object of the present invention is to provide a microscopic photographing apparatus which is simple in the structure and is low in the price.

A further object of the present invention is to provide a microscopic photographing apparatus which is high in the operability and can be fitted as an attachment to the microscope body.

According to the present invention, the above-mentioned objects are attained by a photographing apparatus provided with an indicator arranged to be in a position substantially conjugate with the image surface, a light source for illuminating the indicator, an output generating means for determining the exposure time and an adjusting means which can proportionally adjust the output of the light source and the output of the output generating means so that, when the adjusting means is operated to make the brightness of the indicator brightened by the light from the light source coincide with the brightness of the sample image, the output of the output generating means may be determined so as to make it possible to photograph the sample image with a proper exposure.

The microscopic photographing apparatus according to the present invention is realized by fitting in the form of attachments a bright frame veiwer and a controller including light sources to a conventional automatic exposure photographing apparatus for microscopes. The bright frame viewer utilized here is of the type diclosed in U.S. patent application Ser. No. 719,541, now U.S. Pat. No. 4,643,550, and the controller is arranged in front of a light receiving element. In a preferred formation of the present invention, focus plate is illuminated by a light emitting diode (brightness comparing light source) from the side of the focus plate to brighten an indicating pattern engraved on the focus plate and to proportionally control the brightnesses of the light emitting diode and the light measuring light source (light emitting diode) placed in front of the light receiving element. When the brightness of the indicating pattern on the focus plate is made to coincide with the brightness of the sample image so as to be equal by the operation of a light adjusting dial, if the brightness of the light measuring light source in front of the light receiving element is of a light amount making a proper exposure for the light receiving element receiving it, as a result, a proper exposure will be obtained in the photographing based on the light measuring data.

It is important here that, irrespective of the size of the image projected onto the viewer, the brightness of the indicating pattern can be made to coincide with the brightness of the image. Therefore, if a sample image of 1% full area is of such a brightness that the light measurement is possible and the image is of such a size that it can be seen by sight, the light will be able to be measured for an image far smaller than the 1% spot light measuring area and a proper exposure will be able to be obtained. Then, as the operation of correcting the exposure is not required, the same sample under the same conditions (such as the magnification) can be continuously photographed. Particularly, with a fluorescent illumination, colors fade often so quickly that the rapidness of photographing is important.

The operation of this light adjusting volume can be said to be a kind of exposure correction. The fact that the exposure can be corrected while confirming the result within the viewer field is very effective in consideration of the fact that the fluorescent microscopy is made in a semi-dark or dark room.

The controller is provided with an auxiliary light adjusting volume so that the light amount of the light emitting diode of the light measuring light source can be singly adjusted to make the levels of the light emitting diode of the viewer and the light emitting diode of the light measuring light source coincide with each other.

The apparatus of the present invention can be applied also to a photographing apparatus only for the average light measurement. In such case, if the average light measurement is 30% of the 35 mm film surface and the spot light measurement is 1%, the light amount received by the light receiving element will increase to be 30 times as large, the light measuring ability will be able to be that much spared and the longest exposure time will be able to be extended to the advantage. The electronic circuit for realizing the apparatus of the present invention may be such that the light adjustments of the two light emitting diodes may be operatively connected with each other and the light amount ratio may be constant irrespective of the brightness. Thus, a very simple circuit can be realized. A plurality of light emitting diodes to be used to illuminate the focus plate may be prepared so as to select colors in conformity with the colors of the sample. The apparatus of the present invention can be applied to photographing apparatus not only for microscopes but also for astronomical telescopes and also to general cameras.

These and other objects and advantages of the present invention will become more apparent during the course of the following detailed description and appended claims.

DESCRIPTION OF THE PREFERRED EMBODIMENTS

Figure 1:
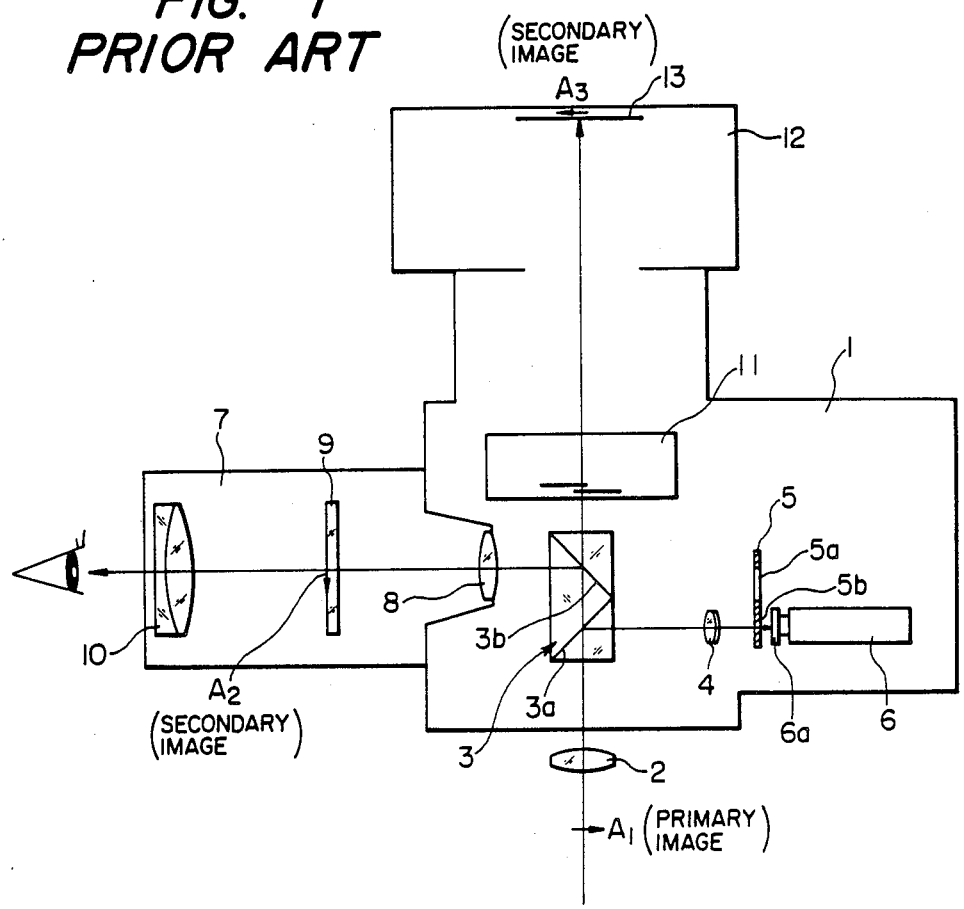
FIG. 1 is a schematic view showing an example of the conventional photographing apparatus for microscopes.

The present invention shall be explained in detail in the following on the basis of the illustrated first embodiment by attaching the same reference numerals respectively to the same members as in the above-mentioned conventional example. In this embodiment, a light measuring light emitting diode is used as the output generating means for determining an exposure time of the photographing.

Figure 3:
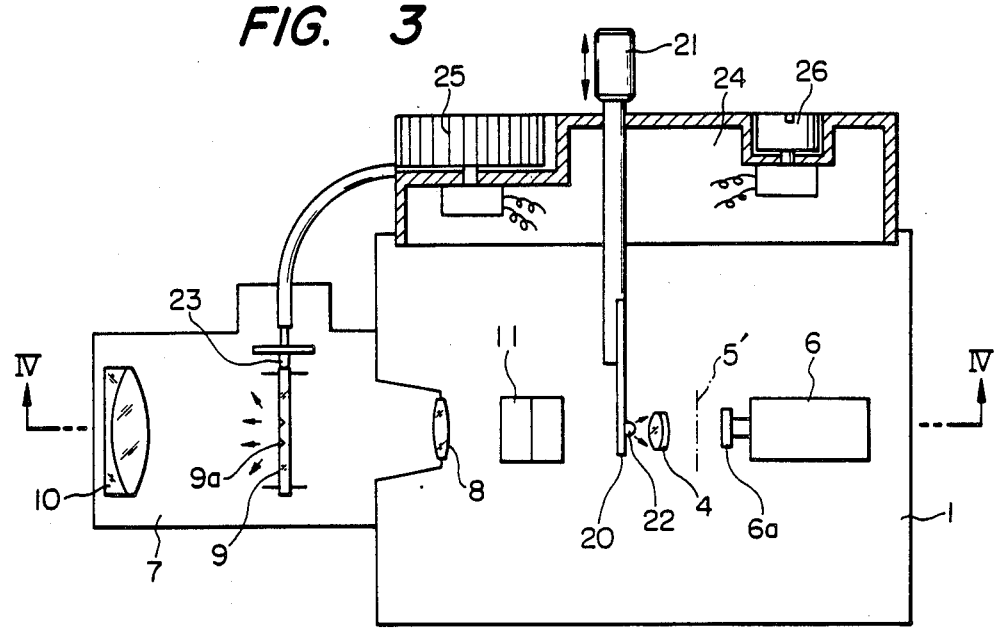
FIG. 3 is a schematic sectional view of the first embodiment of the microscopic photographing apparatus according to the present invention.
Figure 4:
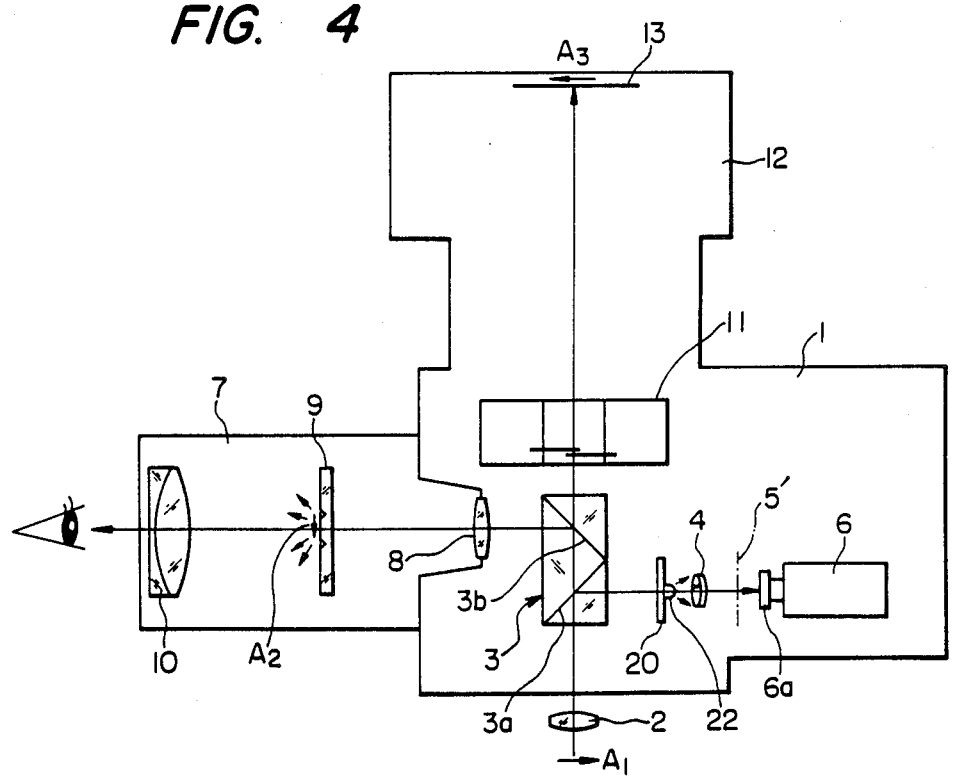
FIG. 4 is a schematic sectional view along the line IV—IV in FIG. 3.

First of all, with reference to FIGS. 3 and 4, the reference numeral 20 represents a plate secured to the tip of a knob 21 slidably supported in an automatic exposure device body, able to be inserted into a light measuring optical system by sliding the knob 21 in the direction indicated by the arrow and having a light measuring light emitting diode 22 fitted to the lower end. The viewer 7 is of the same structure as of the bright frame viewer mentioned in U.S. patent application Ser. No. 719,541. That is to say, the focus plate 9 formed as an indicator has indicating lines 9a made by engraving on one surface of such transparent plate as, for example, of glass and is so arranged that the surface may be in a position conjugate with the film surface 13. The entire viewer 7 is detachably mounted on the automatic exposure photographing apparatus body 1.

The light from an illuminating light source, that is, a brightness comparing light emitting diode 23 arranged on the side of the focus plate 9 reciprocates while repeating reflection through the focus plate 9 and is scattered out of the engraved parts 9a painted with a light scattering agent. The reference numeral 24 represents a controller detachably attached to the automatic exposure photographing apparatus body 1. By the operation of a light adjusting dial 25 provided in the controller 24, the light of the light measuring light emitting diode 22 and the light of the brightness comparing light emitting diode 23 are proportionally adjusted. The reference numeral 26 represents an auxiliary light adjusting dial so that the light of the light measuring light emitting diode 22 may be adjusted by operating it.

Figure 5:
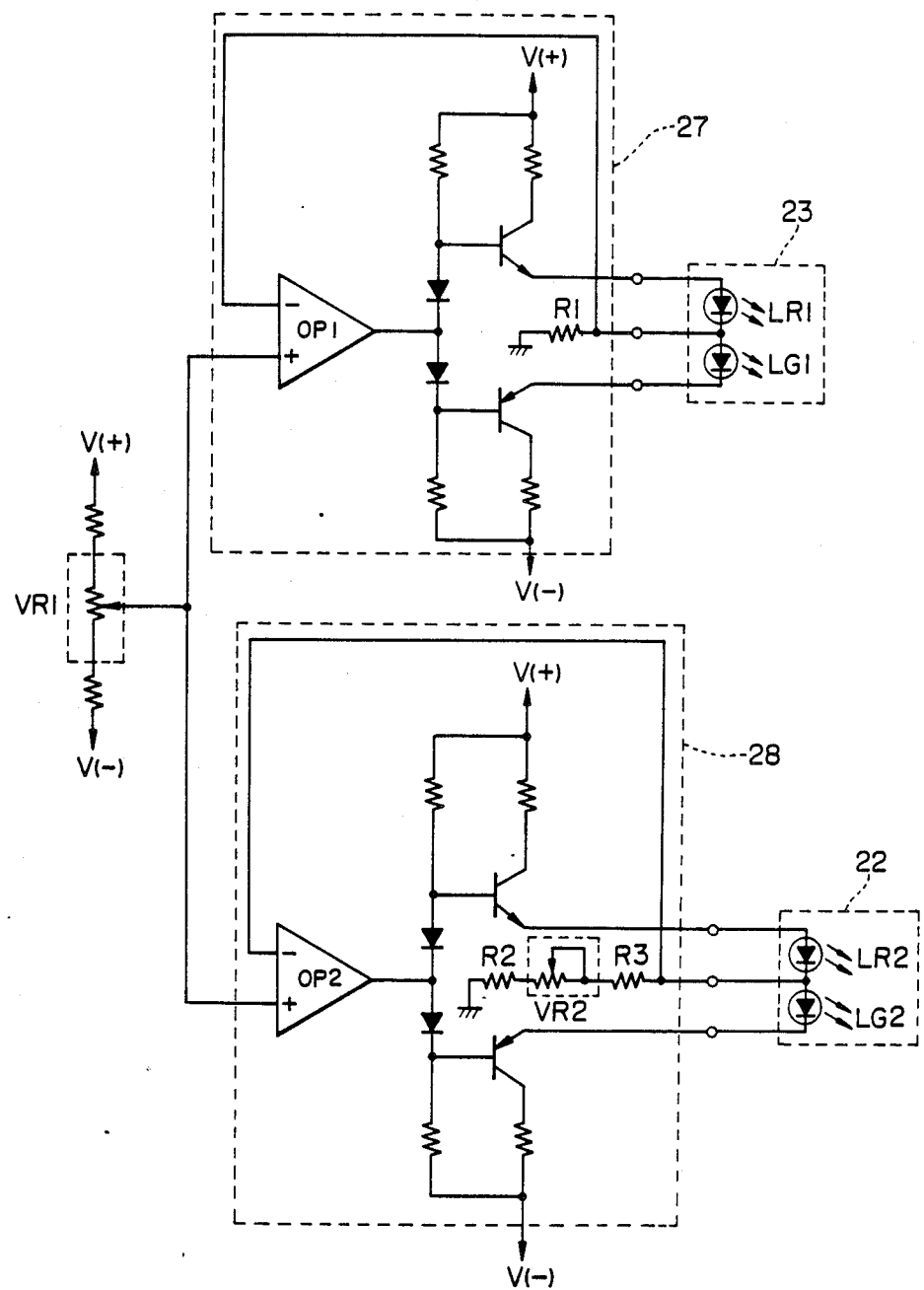
FIG. 5 is a wiring diagram of a light adjusting circuit in the first embodiment.

FIG. 5 shows a light adjusting circuit of the above-mentioned embodiment. The reference symbols LR1 and LG1 represent respectively a red light emitting diode and green light emitting diode forming the brightness comparing light emitting diode. The reference symbols LR2 and LG2 represent respectively a red light emitting diode and green light emitting diode forming the light measuring light emitting diode 22. The respective light emitting efficiencies are uniform. The reference symbol VR1 represents a variable resistor connected with the light adjusting dial 25 to adjust the brightnesses of the light emitting diodes 23 and 22. The sliding contact of this variable resistor VR1 is connected to the (+) input terminals of operation amplifiers OP1 and OP2. The operation amplifier OP1 forms a constant current circuit 27 wherein an electric current is made to flow so that the potential of a current detecting resistor R1 may be fed back to the (−) input terminal and may become equal to the potential of the variable resistor VR1. That is to say, when the variable resistor VR1 is of a positive potential, the current detecting resistor R1 will operate to be also of the same positive potential, the current will flow into the resistor R1 through the red light emitting diode LR1, as a result, a constant current proportional to the potential of the variable resistor VR1 will flow to the red light emitting diode LR1 and the red light emitting diode LR1 will emit the light with the brightness proportional to this potential. In case the potential of the variable resistor VR1 is negative, a current will flow to the green light emitting diode LG1 side to emit the light with the brightness proportional to the potential of the variable resistor VR1. The operation amplifier OP2 forms the same constant current circuit 28 as the constant current circuit 27 and operates the same as the operation amplifier OP1 but the current flowing to the light measuring light emitting diode 22 can be changed by the variable resistor VR2 connected with the auxiliary light adjusting dial 26 to change the ratio of the currents flowing to the light emitting diodes 23 and 22. That is to say, the variable resistor VR2 is to balance the light amounts of the brightness comparing light emitting diode 23 and the light measuring light emitting diode 22. By the way, either of the light emitting diodes 23 and 22 may be formed of a single light emitting diode.

Figure 2:
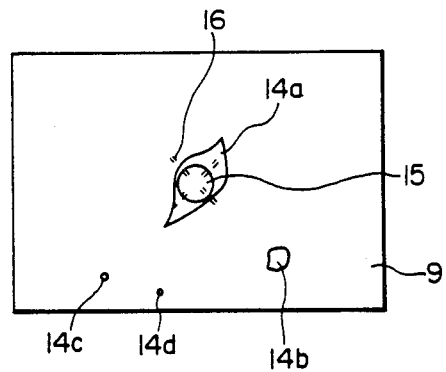
FIG. 2 is an elevational view of a focus plate in FIG. 1.

Now, the operation of the apparatus of the present invention shall be explained with the actual operation. A sample for dark field observation is placed below on a stage of the microscope and its image is formed on the focus plate. This sample image must be such sample image completely filling the spot light measuring area as an image (secondary image) of such size as, for example, of 14a in FIG. 2. For this secondary image 14a, the light of the brightness comparing light emitting diode 23 is adjusted by operating the light adjusting dial 25 so that the brightness of the light scattered from the engraved part 9 may coincide with the brightness of the secondary image 14a.

Then, the knob 21 is pulled out to make an automatic exposure mode. The light from the first beam splitter 3 is received by the light receiving element 6a, the output of the light receiving element 6a is operated by a light measuring circuit not illustrated to determine the exposure time which is indicated in an indicating device not illustrated. Then the knob 21 is pushed in so that the light from the light measuring light emitting diode 22 may be incident on the light receiving element 6a.

Here, if the exposure time indicated in the indicating device is different from the exposure time obtained by the previous automatic exposure, the light will be adjusted by the operation of the auxiliary light adjusting dial so that the exposure time may coincide. By this operation, the light amounts of the brightness comparing light emitting diode 23 and the light measuring light emitting diode 22 will be balanced. After this initial operation is completed, the auxiliary light adjusting dial will not move and therefore will be preferably fixed.

After the initial operation is completed, when a bright comparing exposure mode is made, the ordinary operation, that is, only the operation that the knob 21 is pushed in and the brightnesses of the sample image and the light from the brightness comparing light emitting diode 23 are made to coincide with each other by adjusting the light adjusting dial 25 will do and thereby a proper exposure will be obtained. In such case, irrespective of the size of the sample image, the brightness of the brightness comparing light emitting diode 23 can be made to coincide with the brightness of the sample image and therefore a proper exposure can be obtained irrespective of the size of the sample image including an image far smaller than the light measuring area.

By the way, generally, when a normal current $I_F$ is made to flow through a light emitting diode of a PN junction, the light emitting output (radiation bundle; $\phi_e$) will be represented by the following formula $$\phi_e = \frac{1.24}{\lambda} \cdot \eta_e I_F$$

where $\theta_e$ represents an external quantum efficiency and $\lambda$ represents a peak wavelength.

It is found thereby that, in order to keep the brightness ratio of the light emitting diodes 23 and 22 constant, the current ratio may be kept constant. Here, as the dynamic range securing the linearity of $\phi_e$ and $I_F$ is limited, it is preferable to use the two light emitting diodes 23 and 22 with a substantially equal current so long as the same kinds of diodes are used. Therefore, it is preferable to take a method wherein, instead of using the variable resistor VR2, as shown by the reference numeral 5 (FIGS. 3 and 4), such optical element as a fixed stop or variable stop or a filter is provided between the light measuring light emitting diode 22 and the light receiving element 6 to limit the light amount. In such case, for example, the variable stop is adjusted by the auxiliary light adjusting dial 26.

As understood from the above structure, the apparatus of the present invention can be attached to the conventional type automatic exposure photographing apparatus by merely adding a minor mechanical work and the new system can be incorporated without altering the electric system at all. Therefore, it is a great feature that the structure is simple and can be provided at a low cost.

Figure 6:
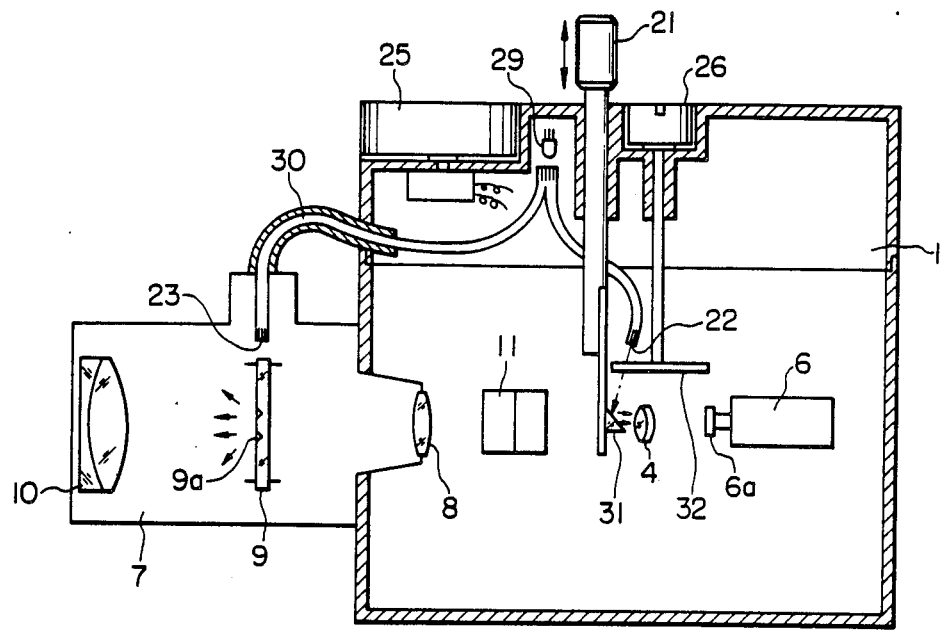
FIG. 6 is a schematic sectional view showing the second embodiment of the present invention.

FIG. 6 is a sectioned view of the second embodiment. In this embodiment, the light source 29 is made one and the light to be projected onto the focus plate 9 and light receiving element 6a is transmitted as divided into two through a fiber cable 30 from the light source 29. According to this system, as the single light source 29 is used, a wide linearity can be secured in the brightness ratio. However, if the fiber 30 is inserted and removed at the exit end whenever the knob 21 is inserted and removed, the line will be likely to be cut off. Therefore, for example, as illustrated, the light is made to enter the light receiving element 6a through a mirror 31 fitted to the tip of the knob 21 and the fiber 30 is preferably fixed at the exit end. As this embodiment can not be electrically initially set, an optical continuous light attenuator 32 is set in the course of the light receiving element side light path. This continuous light attenuator 32 is rotated by the operation of the auxiliary light adjusting dial 26.

By the way, there is a method of adjusting the light amount on the light receiving element side in an example of using a fiber cable wherein the distance and angle between the light source and the entrance end of the fiber cable or between the exit end of the fiber cable and the light receiving element are mechanically changed.

Figure 7:
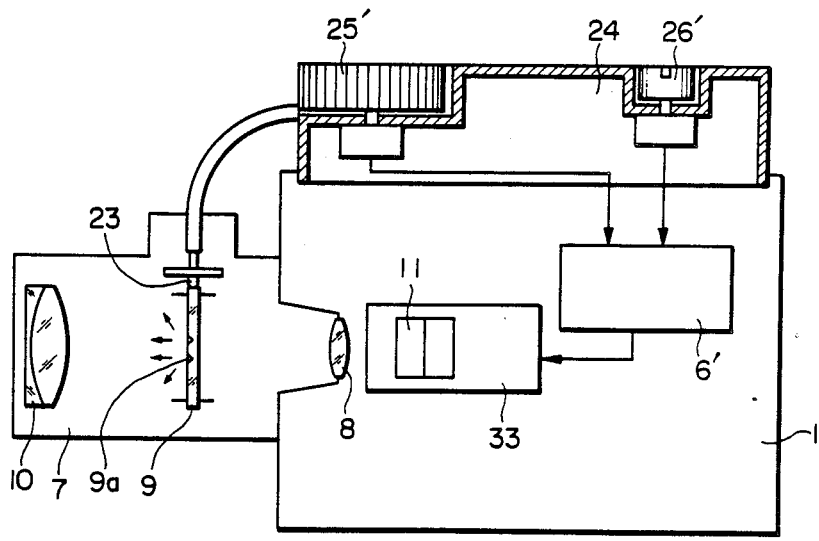
FIG. 7 is a schematic sectional view showing the third embodiment of the present invention.

FIG. 7 is a schematic sectional view of the third embodiment. In this embodiment, an output corrector 6' which supply an actuating signal to a shutter controller 33 to control the opening and closing of the shutter 11 is used as the output generating means for determining the exposure time of the photographing. The output corrector 6' is connected to an adjusting dial 25' and an auxiliary adjusting dial 26' and adapted to control the issuance of the actuating signal in response to the adjustment of the adjusting dial 25' and/or the auxiliary adjusting dial 26' to thereby to enable to obtain a proper exposure. According to this system, a proper exposure time is electrically adjusted instead of optically adjusting as in the first and second embodiments. The auxiliary adjusting dial 26' is used to set a reference value in the output corrector 6'. However, this auxiliary adjusting dial 26' will not be necessary if a reference value for correcting a non-linearity is stored in a ROM for a CPU constituting the output corrector 6'.

As in the above, according to the apparatus of the present invention, any image in a visible range can be photographed with a substantially proper exposure and therefore a wide application is considered.

Figure 8:
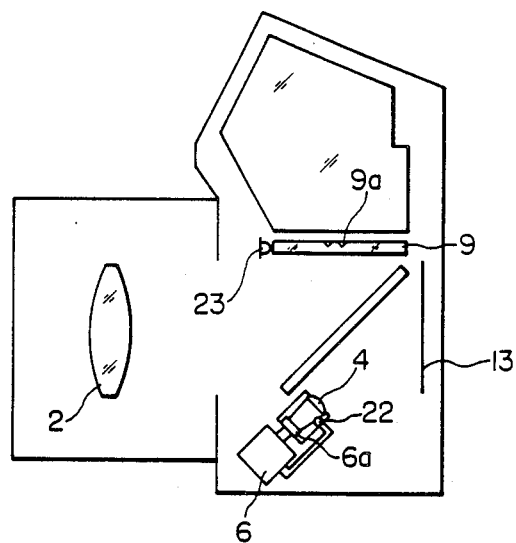
FIG. 8 is a schematic sectional view showing an application example of the apparatus according to the present invention.

FIG. 8 shows an example of applying the principle of the present invention to a single-lens reflex camera. In this case, the light measuring light emitting diode 22 is incorporated in the housing of the light receiving element 6a. The light adjusting dial 25 is attached to the camera body. In such case, when a photographing range indicating frame is provided adjacently to the picture frame of the focus plate 9, the picture frame range will be able to be also made definite in photographing a night view or astronomy.

Figure 9:
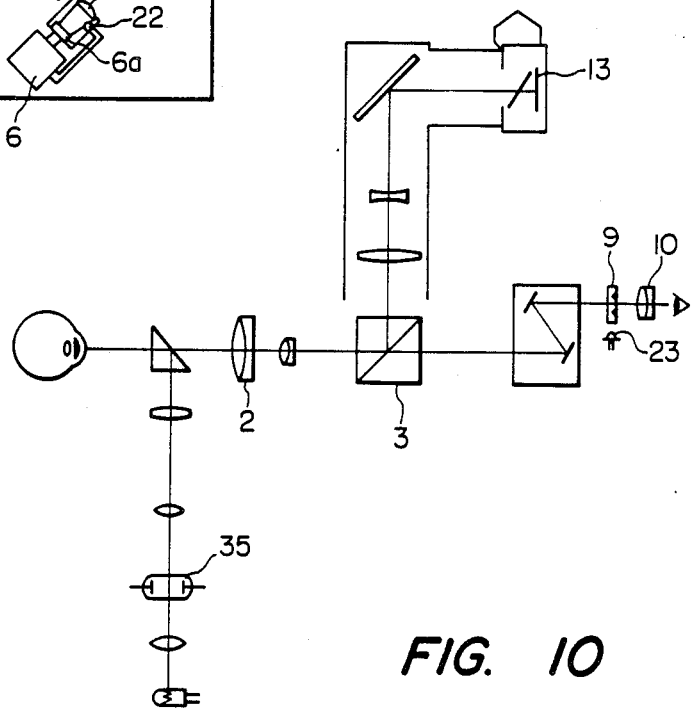
FIG. 9 is a schematic sectional view showing another application example of the apparatus according to the present invention.
Figure 10:
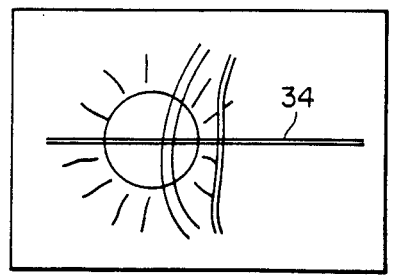
FIG. 10 is an elevational view of a focus plate in FIG. 9.

FIG. 9 shows an example of applying the principle of the present invention to a photographing apparatus for slit lamp microscopes. In the case of a slit lamp microscope, too, various patterns on the cornea surface appear in a substantially dark field and the automatic exposure and manual exposure are difficult in photographing. If the principle of the present invnention is applied, such exposures will be very easy. Here, for the patterns peculiar to the slit lamp microscope, double cross lines 34 (FIG. 10) for focusing and brightness coincidence are arranged as crossed. In the case of the slit lamp microscope, in strobo-photographing, one of the light adjusting circuits is connected preferably to the output controlling circuit of a strobe 35 (FIG. 9) and, if the light amount adjustment of a modeling lamp (brightness comparing light emitting diode 23) is monitored and the increase or decrease of the light amount is added to the output of the strobe 35 to correct the output, a proper exposure will be able to be always obtained.

As described above, as the brightness comparing light measuring system is adopted in the microscopic photographing apparatus according to the present invention, irrespective of the size of the image including an image far smaller than the light measuring area, a proper exposure can be obtained and the automatic exposure range substantially greatly expands. Further, in the apparatus of the present invention, the structure is very simple, the automatic exposure circuit need not be high in the performance and the light adjusting circuit is independent of the automatic exposure circuit. Therefore, this apparatus can be provided at a low cost. Also, the apparatus of the present invention is high in the operability because the brightnesses can be quickly made to coincide with each other within the viewer, can be fitted as an attachment and is therefore convenient.

What is claimed is:

1. A photographing apparatus for microscopes comprising a film set in an image forming position on a first light path of a light from a sample, an indicator arranged in a position substantially conjugate with the surface of said film on a second light path branched from the first light path, a first light source for illuminating said indicator arranged adjacently to said indicator, an output generating means for determining the exposure time in photographing of a sample image formed on said film and a first adjusting means connected to said first light source and output generating means and capable of proportionally adjusting the brightness of said first light source and the output to be issued from said output generating means, the output to be issued from said output generating means being determined so as to make it possible to photograph the sample image with a proper exposure by operating said first adjusting means to make the brightness of said indicator determined by said first light source coincide with the brightness of the sample image formed on said indicator.

2. An apparatus according to claim 1 wherein said output generating means is a second light source capable of being inserted into a third light path branched from the first light path.

3. An apparatus according to claim 1 wherein said first adjusting means is a variable resistor.

4. An apparatus according to claim 2 further comprising a second adjusting means connected to said second light source and capable of adjusting only the brightness of said second light source.

5. An apparatus according to claim 2 wherein said second light source is a light emitting diode and is arranged near the light receiving element for the exposure time controlling circuit arranged on the third light path.

6. An apparatus according to claim 4 wherein said second adjusting means is a variable resistor.

7. An apparatus according to claim 5 further comprising an optical light adjusting element interposed between said light emitting diode and said light receiving element.

8. An apparatus according to claim 2 wherein said first light source and second light source are respectively the exit ends of branched fiber cables leading the light from the third light source and said second light source is arranged near the light receiving element for the exposure time controlling circuit arranged on the third light path.

9. An apparatus according to claim 8 further comprising an optical light adjusting means interposed between said second light source and said light receiving element.

10. An apparatus according to claim 1 wherein said output generating means is an output corrector connected directly to an exposure controlling device.

11. An apparatus according to claim 10 further comprising a second adjusting means connected to said output corrector and capable of adjusting an output to be issued from said output corrector.

12. An apparatus according to claim 1 wherein said indicator and said first light source are contained within a viewer, said output generating means and said first adjusting means are contained within a controller unit, and said viewer and controller are respectively detachably mounted on an automatic exposure photographing apparatus body containing therein said film, first light path and second light path.

13. An apparatus according to claim 4 wherein said indicator and said first light source are contained within a viewer; said second light source, said first adjusting means and said second adjusting means are contained within a controller unit; and said viewer and controller unit are respectively detachably mounted on an automatic exposure photographing apparatus body containing therein said film, first light path, second light path and third light path.

14. An apparatus according to claim 7 wherein said indicator and said first light source are contained within a viewer; said second light source, said first adjusting means and said optical light adjusting element are contained within a controller unit; and said viewer and controller unit are respectively detachably mounted on an automatic exposure photographing apparatus body containing therein said film, first light path, second light path, third light path and light receiving element.

15. An apparatus according to claim 9 wherein said indicator and said first light source are contained within a viewer; said second light source, said first adjusting means, said third light source, said fiber cable and said optical light adjusting means are contained within a controller unit; and said viewer and controller unit are respectively detachably mounted on an automatic exposure photographing apparatus body containing therein said film, first light path, second light path, third light path and light receiving element.

16. An apparatus according to claim 11 wherein said indicator and said first light source are contained within a viewer; said output corrector, said first adjusting means and said second adjusting means are contained within a controller unit; and said viewer and controller unit are respectively detachably mounted on an automatic exposure photographing apparatus body containing therein said film, first light path, second light path and exposure controlling device.

* * * * *